United States Patent [19] [11] 3,855,243
Ruschig et al. [45] Dec. 17, 1974

[54] 3-AMINOACYLAMINO THIOPHENES
[75] Inventors: Heinrich Ruschig, Bad Soden, Taunus; Manfred Schorr; Roman Muschaweck, both of Frankfurt am Main; Robert Rippel, Hofheim, Taunus, all of Germany
[73] Assignee: Farbwerke Hoechst Aktiengesellschaft Vormal Meister Lucius & Bruning, Frankfurt, Germany
[22] Filed: Oct. 1, 1973
[21] Appl. No.: 402,382

Related U.S. Application Data
[63] Continuation-in-part of Ser. No. 105,991, Jan. 12, 1971, abandoned, which is a continuation-in-part of Ser. No. 750,399, July 2, 1968, abandoned.

[30] Foreign Application Priority Data
July 7, 1967   Germany.......................... 1643325

[52] U.S. Cl.................... 260/332.2 C, 260/247.1, 260/268 FT, 260/293.68, 260/326.35, 260/332.2 R, 424/248, 424/250, 424/267, 424/274, 424/275
[51] Int. Cl................... A61k 27/00, C07d 63/16, C07d 63/12
[58] Field of Search... 260/332.2 R, 332.2 C, 247.1, 260/293.68, 326.35, 268 FT

[56] References Cited
UNITED STATES PATENTS
3,136,691   6/1964   Nordstrom et al.................... 167/52
2,768,166   10/1956   Bruce et al. ...................... 260/247.2
2,921,077   1/1960   Hiltmann et al................. 260/294.3

OTHER PUBLICATIONS
Gilman, et al., J.A.C.S., 47:245–54 (1925).

Primary Examiner—Henry R. Jiles
Assistant Examiner—C. M. S. Jaisle
Attorney, Agent, or Firm—Curtis, Morris & Safford

[57] ABSTRACT
3-Aminoacylamino-thiophenes of the formula

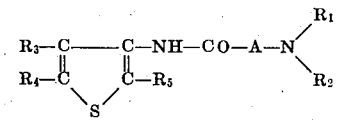

and their physiologically tolerated salts, useful as local anesthetics. Methods of making these compounds. In the formula, $R_1$ may be hydrogen, alkyl, hydroxyalkyl, alkoxyalkyl, cycloalkenyl, or alkenyl; $R_2$ is alkyl, hydroxyalkyl, alkoxyalkyl, cycloalkyl, or alkenyl; $R_1$ and $R_2$, taken together, may also form a saturated heterocyclic ring with the nitrogen atom to which they are attached, which ring may also contain an oxygen atom, a methylimino group, or a further nitrogen atom; $R_3$, $R_4$, and $R_5$ are each hydrogen, alkyl, or carbalkoxy; and A is alkylene.

6 Claims, No Drawings

3-AMINOACYLAMINO THIOPHENES

This application is a continuation-in-part of application Ser. No. 105,991, filed Jan. 12, 1971, which in turn is a continuation application of application Ser. No. 750,399 filed July 2, 1968 (now both abandoned).

The present invention relates to 3-aminoacylaminothiophenes.

More in particular, the invention relates to 3-aminoacylamino-thiophenes of the formula

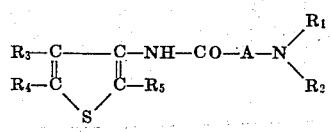

wherein $R_1$, taken alone, is hydrogen, alkyl having one to six carbon atoms which may be substituted by hydroxy or alkoxy having one to three carbon atoms, cycloalkyl having five or six carbon atoms, or alkenyl having two to four carbon atoms; $R_2$ is alkyl having one to six carbon atoms which may be substituted by hydroxy or alkoxy having one to three carbon atoms, cycloalkyl having five or six carbon atoms, or alkenyl having two to four carbon atoms; $R_1$ and $R_2$, taken together with the nitrogen atom to which they are attached, form a saturated heterocyclic ring having five to seven ring members and which may additionally contain an oxygen or nitrogen atom or a methylimino group; $R_3$, $R_4$, and $R_5$ are each hydrogen, alkyl having one to four carbon atoms, or carbalkoxy; and A is alkylene having one to four carbon atoms.

Compounds of this type which, with their physiologically tolerated salts, are more particularly disclosed herein have the formula

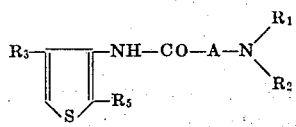

wherein $R_1$, taken alone, is hydrogen or alkyl having up to four carbon atoms; $R_2$, taken alone, is alkyl having up to four carbon atoms; $R_1$ and $R_2$, taken together with the nitrogen atom to which they are attached, are piperidino, pyrrolidino, morpholino, or N-methyl piperazino; one of $R_3$ and $R_5$ is methyl and the other is carbomethoxy or carbethoxy; and A is alkylene having one or two carbon atoms.

These 3-aminoacylamino-thiophenes can be prepared by a number of processes. Thus, a. 3-halogenoacylamino-thiophenes of the formula II

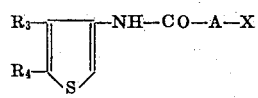

in which X represents halogen, for example chlorine, bromine or iodine, or alkoxy, aralkoxy or aryloxy, are reacted with a primary or secondary amine of the formula III

or b. 3-amino-thiophenes of the general formula IV

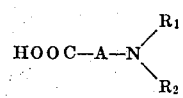

or the salts or Grignard compounds thereof, are acylated with an amino-carboxylic acid of the formula V

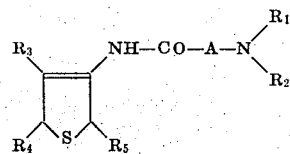

or with a reactive derivative thereof; or c. 3-amino-4,5- or 2,5-dihydro-thiophenes of the formulas VIa or VIb

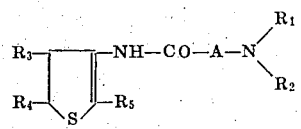

or,

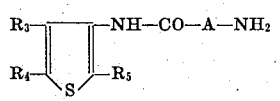

are dehydrogenated; or d. 3-aminoacylamino-thiophenes of the formula VII

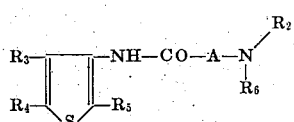

are alkylated in known manner; or e. compounds of the formula VIII

in which $R_6$ represents an ester group, are hydrolyzed; or f. amines of the formula are reacted with unsaturated acylamino-thiophenes of the formula XI

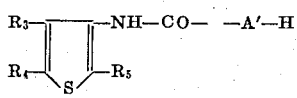

in which A' represents alkenyl of two to four carbon atoms; or g. thiophene-isonitriles of the formula X

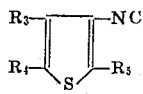

are reacted with amines of the formula

in the presence of aliphatic aldehydes of one to four carbon atoms, and any carbalkoxy groups that may be present in $R_3$-, $R_4$- and/ or $R_5$-position are hydrolyzed and decarboxylated and, if desired, the compounds obtained are converted by means of acids into physiologically tolerated salts.

a. the 2-halogeno-acylamino-thiophenes of the formula II used in method (a) preferably contain chlorine or bromine in the acyl group. For reaction with the 3-halogeno-acylamino-thiophenes, the following amines of the formula III may be used, for example: alkylamines such as methylamine, ethylamine, n-propylamine, isopropylamine, n-butylamine, isobutylamine, sec. butylamine, tert. butylamine; alkynylamines such as allylamine; cycloalkylamines such as cyclohexylamine; hydroxyalkylamines such as 3-hydroxypropylamine and diethanolamine; alkoxyalkylamines such as methoxyethylamine; dialkylamines such as diethylamine and di-n-butylamine; furthermore alkyleneimines such as piperidine, pyrrolidine, morpholine, and N-methylpiperazine. The reaction of the halogeno-acylamino-thiophenes with the amines may be carried out in the presence or in the absence of solvents. As solvents, ether; dioxane; alcohols such as methanol, ethanol, and propanol; saturated cyclic hydrocarbons such as cyclohexane and methylcyclohexane; aromatic hydrocarbons such as benzene, toluene, and xylene; and chlorinated hydrocarbons such as chlorobenzene, chloroform, and carbon tetrachloride may be used. The reaction temperatures are between room temperature and the boiling temperature of the solvent used; pressure may also be applied during the reaction. In order to neutralize the acid formed during the reaction, it is preferable to operate with an excess of amine, using at least 2 parts of amine for one part of 3-halogeno-acylamino-thiophene. The reaction time which, depends on the reaction temperature, is about 4 to 12 hours. For purification, the amino-hydrohalide formed as a by-product is eliminated by solution, the solvent and the excess amine are removed by distillation, and the product of the invention remaining is purified by distillation or by solution in a mineral acid and precipitation with dilute sodium hydroxide solution.

The halogeno-acylamino-thiophenes used as starting substances are prepared in a known manner. For example, aminothiophenes or amino-thiophene-carboxylic acid esters are reacted with halogeno-acyl halides and the resulting products are hydrolyzed, if necessary. The amino-thiophenes and amino-thiophene-carboxylic acid esters are likewise obtained in a known manner, the first by hydrolysis and decarboxylation of the amino-thiophene-carboxylic acid esters, the latter, for example, by the reaction of $\alpha,\beta$-dihalogeno-nitriles or 2-acylamino-1,3diketones with thioglycolic acid esters in the presence of alkaline condensation agents. When amino-thiophenes which have a carbalkoxy group in the 4-position are used as starting materials, these may be obtained [cf. Journal Am. Chem. Soc. 67, 729, 731 (1945)] from the corresponding thiophanone-(3)-carboxylic acid esters and hydroxylamine.

Instead of the halogeno-acylamino-thiophenes, it is also possible to start from alkoxy-, aralkoxy- or aryloxy-acylamino-thiophenes. For example, methoxy-, ethoxy-, benzyloxy- or phenoxy-substituted acylamino-thiophenes may be used. They may be obtained, for example, by the reaction of amino-thiophenes or amino-thiophene-carboxylic acid esters with alkoxy-, aralkoxy- or aryloxy-carboxylic acids and chloroformic acid esters according to the method of mixed anhydrides.

b. The products of the present invention may also be obtained according to method (b) by reacting 3-amino-thiophenes of the formula IV with an amino-carboxylic acid of the formula V or, preferably, with a reactive derivative of such an acid. As amino-carboxylic acids, there may be mentioned, for example: methylaminoacetic acid, ethylaminoacetic acid, n-propylaminoacetic acid, sec. butylaminoacetic acid, cyclohexylaminoacetic acid, diethylaminoacetic acid and piperidylaminoacetic acid. Instead of the mentioned aminoacetic acids, the correspondingly substituted $\alpha$- and $\beta$-aminopropionic acids and the various isomeric aminobutyric acids and aminovaleric acids may also be used. As reactive derivatives of the aminocarboxylic acids, the acid chlorides, the acid esters, the acid amides, the acid azides and the acid anhydrides may be used, for example. Instead of the 3-amino-thiophenes, their salts may also be used, for example the alkali metal salts or the alkaline earth metal salts, or their Grignard compounds (halogeno-magnesium compounds). The reaction is advantageously carried out in inert solvents, for example in ether, benzene, toluene, or xylene.

(c) The dehydrogenation of the starting substances of the formulae VIa and IVb is carried out in a known manner with the usual dehydrogenation agents. Chloranil has proved to be a particularly suitable dehydrogenation agent; as a solvent an aromatic hydrocarbon such as toluene, xylene, or mesitylene is used. Preferably, the whole is heated for 5 to 15 hours to the boiling temperature. When bromine is used as the dehydrogenation agent, it is of advantage to operate with cooling, preferably at $-10°$ to $+10°$ C. In this case, halogenated hydrocarbons are preferably used as solvents, for example methylene chloride, chloroform, or carbon tetrachloride. Basic agents are not required for cleaving the hydrogen halides. The 3-(substituted amino)- acylamino-2,5- or -4,5-dihydro-thiophenes used as starting materials are obtained in analogous manner from the corresponding thiophenes [compare method (a)] using correspondingly substituted amino-dihydrothiophenes. The latter can be prepared from correspondingly substituted thiophanones by introducing ammonia gas or by heating with ammonium acetate.

d. The alkylation of the starting substances of the formula VII is effected according to known methods, for example with aldehydes or ketones in the presence of reducing agents, for example formic acid. As alkylating agents, mineral acid esters, for example alkyl halides, sulfuric acid esters, or phosphoric acid esters may also be used. Aryl-sulfonic acid esters are also suitable. The starting substance of the formula VII may be obtained according to the general methods for the preparation of aminoacylamino-thiophenes described under (a).

e. In compounds of the formula VIII, $R_6$ represents an ester group such as is generally used in peptide chemistry for the protection of amino-groups. As examples, the following groups may be mentioned: carbobenzoxy, mercapto-carbonyl, tosyl, trifluoroacetyl, tert. butyloxy-carbonyl and o-nitrophenyl-sulfenyl. Cleavage of this group is likewise effected according to the methods commonly used in peptide chemistry, for example by means of sodium in liquid ammonia or by means of hydrogen bromide in glacial acetic acid. In some cases, the cleavage reaction takes place in dilute hydrochloric acid. In this manner compounds are obtained in which $R_1$ represents hydrogen.

f. The process may also be carried out by reacting acylamino-thiophenes or acylamino-thiophene-carboxylic acid esters which contain a double bond in the acyl chain with a correspondingly substituted primary or secondary amine. As acyl groups which contain double bonds, there enter into consideration, for example, the residues of acrylic acid, methacrylic acid, tiglic acid, and isocrotonic acid.

Reaction with the amines can be effected at room temperature or at elevated temperature, with or without application of pressure and/or solvents. In most cases, an excess of amine, preferably about 3 mols per one mol of acyl derivative, is used. The starting substances of the formula IX are prepared, for example, by the reaction of the unsaturated acid chlorides with amino-thiophene or amino-thiophene-carboxylic acid esters. By method (f), however, α-aminoacylaminothiophenes cannot be prepared. g. The thiophene-isonitriles of the formula X are prepared according to methods known per se (Neuere Methoden der prap. org. Chemie, Volume IV, pages 43 et seq.) by reaction of the corresponding formylamino-thiophenes with water-separating agents. The reaction with aldehyde and amine to form the products of the invention is effected at room temperature in an aqueous/organic medium; the pH-value is adjusted to about 5 to 8 by the addition of acid. The reaction time is between a few minutes and 100 hours. When primary amines are used, it is suitable to operate with an excess of amine. If the products prepared according to the methods (a) to (d) still contain carbalkoxy groups in the $R_3$-, $R_4$- and/or $R_5$ -position, these may be removed, if desired, by hydrolysis and decarboxylation. The hydrolysis is effected in a known manner with alkali metal hydroxides or alkaline earth metal hydroxides. This may be carried out at room temperature or at elevated temperature. Decarboxylation is effected, for example, by heating with suitable organic bases, for example quinoline or diethyl-aniline, in the presence of copper powder, preferably just below the boiling point of the organic bases.

In form of their salts, the products of the present invention are quite soluble in water. For salt formation, organic and mineral acids, for example acetic acid, lactic acid, maleic acid, citric acid, tartaric acid, aceturic acid, amidosulfonic acid, hydroxyethane-sulfonic acid, phosphoric acid, hydrochloric acid and hydrobromic acid may be used.

The salts crystallize well and are very stable. Their aqueous solutions are readily stored, can be sterilized without difficulty and do not irritate the tissues. The compounds, in their free form as well as in the form of their salts, are valuable medicaments that have interesting pharmacological properties. Because of their high efficacy and their low toxicity, they are especially suitable as local anesthetics.

The toxicities of the compounds of the present invention are of the same order as those of the compounds hitherto generally used as infiltration anesthetics. But, by reason of their chemical constitution, they involve a lower degree of risk of inducing allergies than do the heretofore-used benzoic acid derivatives or aniline derivatives. The risk of a group sensitization towards sulfonamides and other similarly constituted compounds is, thus, essentially smaller.

The local tolerance of the compounds of the present invention correpsonds to that of procaine, which has hitherto been the locally most tolerated local anesthetic. This was proved by the test of the surface anesthesia in a rabbit's eye according to Regnier as well as after intracutaneous injection into a rabbit's ear and by the intracutaneous wheal test in humans (forearm). In the same way, their compatibility with vasoconstrictive agents and other necessary additives such as stabilizers was texted and proved.

The duration of the infiltration anesthetic action of the products of the invention was tested in Guinea pig's wheals, modified according to E. Bulbring and J. Wajda [J. Pharmacol. London, 85, 78 (1945)]. The results obtained showed that the compounds of the invention are equivalent or superior to known commercial products.

The test for conduction anesthetic activity was effected in a laid-open sciatic nerve of a frog according to Ther [Naunyn-Schmiedeberg's Arch. exper. Path. and Pharmakol. 220, 300 (1953)].

After 1 minute, 80 – 100 percent of the sciatic nerves of a frog show complete conduction anesthesia using 2-chloro-6-methyl-N-butyl-aminoacetanilide-hydrochloride at a concentration of 0.25 percent. The compounds of the invention gave the same result. In contrast, with 0.25 percent of lidocaine only 40 – 60 percent anesthesia was observed.

The following Table, furthermore, shows that the products of the present invention are active longer than the commercially available product 2-chloro-6-methyl-N-butylaminoacetanilide hydrochloride, which was given the activity duration = 1.

Table

| | |
|---|---|
| (3-n-Propylamino-α-propionylamino-2-carbomethoxy-4-methylthiophene) | = 1.2 |
| (3-n-Butylamino-acetylamino-4-methyl-thiophene) | = 1.2 |
| (3-Diethylamino-β-propionylamino-2-carbomethoxy-4-methyl-thiophene) | = 1.6 |

The toxicity in the case of continuous intravenous infusion of the compounds (infusion rate 1 ml per minute) was tested at various concentrations per kg in a rabbit for determining the speed of excretion (elimination). Whereas lidocaine was only tolerated up to a concentration of 0.5 mg/kg per minute over 2 hours of infusion, the compounds of the present invention were tolerated up to 2 mg/kg per minute. The compounds of results obtained are collected in the following Table.

In addition, the acute toxicity of the tested compounds was determined after intravenous injection in the white mouse as the $LD_{50}$, calculated according to Litchfield and Wilcoxon: J. Pharmacol. Exp. Therap. 96, 99 (1949). the $LD_{50}$ values thus obtained are likewise given in the following Table. The unit of figures shown is milligram per kilogram of mouse.

| Compound | Infiltrationanesthetic Activity | | Toxicity | | Remarks |
| --- | --- | --- | --- | --- | --- |
| | Number of Test Animals | Average Duration of Anesthesia in Minutes ± Standard Deviation | Number of Test Animals | $LD_{50}$ i.v. (lowest and highest values) | |
| 1 a) | 6 | 29.2 ± 1.3 | 60 | 33.0 (31.1–35.0) | |
| 1 b) | 6 | 34.2 ± 1.5 | 70 | 37.0 (33.5–42.0) | |
| 2 a) | 6 | 42.9 ± 3.2 | 50 | 33.0 (29.5–37.0) | |
| 2 b) | 6 | 37.4 ± 2.3 | 70 | 50.5 (40.1–63.6) | |
| 3 a) | 6 | 30.9 ± 4.8 | 60 | 27.8 (26.3–29.3) | locally irritating |
| 3 b) | 6 | 38.4 ± 3.4 | 60 | 55.5 (52.5–58.2) | | the present invention have thus a better detoxication property than lidocaine.

Finally, the new local anesthetics show no methemoglobin formation in the cat.

Certain compounds of the present invention were also compared with respect to their local anesthetic activity and their acute toxicity ($LD_{50}$) on intravenous injection, with certain analogous benzene compounds known from U.S. Pat. No. 2,921,077 to Hiltmann et al. Specifically, 1a. α-n-propylamino-propionic acid-2-carbomethoxy-6-methylanilide;

1b. 3-n-propylamino-α-propionylamino-2-carbomethoxy-4-methylthiophene;

2a. β-diethylamino-propionic acid-2-carbomethoxy-6-methyl-anilide (known from Hiltmann, Example 4, as 2-methyl-6-carbomethoxy-β-N-diethylamiopropionic acid anilide);

2b. 3-diethylamino-β-propionylamino-2-carbomethoxy-4-methylthiophene;

3a. β-n-butylamino-propionic acid-2-carbomethoxy-6-methylanilide; and 3b. 3-n-butylamino-β-propionylamino-2-carbomethoxy-4methylthiophene;

were compared.

The anesthetic action was measured by infiltration according to the method of Buelbring and Wajda [J. Pharmacol. Exp. Therapeut. 85, 78 (1945)]. In this method a wheal is provoked in the guinea pig by the injection of 0.1 ml of the solution to be tested intracutaneously into the guinea-pig's flank. The size of the wheal is marked with a color pencil. The duration of anesthesia is measured by irritating the wheal with a needle (six times every 3 minutes) and observing the reaction of the animal. The end of the anesthesia manifests itself in defense reflexes and utterances of pain.

Depending on the season, the time of day, the breed of the test animals used and other factors, the results obtained, i.e., the time of anesthesia, may vary with one and the same compound. To avoid this, the comparative tests with each pair of compounds, i.e., (1a) and (1b), (2a) and (2b), and (3a) and (3b), respectively, were carried out at the same time and under the same general conditions.

The test compounds were all used as 1 percent by weight aqueous solutions of the hydrochlorides. The It will be evident from the above Table that with about the same or only slightly higher toxicity, known compound (1a) has only about 5/6 of the anesthetic activity of new compound (1b). Compound (1b) is thus distinctly superior to compound (1a) with regard to anesthesia ($P < 0.01$).

With a slightly higher activity of about 15 percent ($P < 0.01$), known compound (2a) shows about 50 percent higher toxicity than new compound (2b). Accordingly, new compound (2b) is distinctly superior to compound (2a) with regard to toxicity.

With about one-half of the toxicity and about 25 percent higher anesthetic activity ($P < 0.05$), new compound (3b) is distinctly superior to known compound (3a) with regard to both anesthesia and toxicity. In addition, known compound (3a) had a locally irritating action.

The substances of the present invention are suitable for the manufacture of pharmaceutical preparations having local anesthetic action. They are suitably administered in the form of isotonic solutions. Such solutions are sterilizable according to known methods without decomposition occurring and are suitable for injection or infiltration. The solutions may contain vasoconstrictive additives, for example adrenaline or noradrenaline. The concentration of the solution with respect to the locally anesthetic active substances of the present invention may range between 0.1 and 5 percent.

The following examples illustrate the invention but they are not intended to limit it thereto:

EXAMPLE 1

3-n-Butyl-amino-acetylamino-2-carbomethoxy-4-methyl-thiophene 24.7 g of 3-chloro-acetylamino-2-carbomethoxy-4-methyl-thiophene [prepared from 3-amino-2-carbomethoxy-4-methyl-thiophene (melting point 84°–85° C.) and chloroacetyl chloride; melting point 118°C. (from methanol)] were dissolved in 200 ml of toluene, 22 g of n-butylamine were added and the whole was heated for 6 – 7 hours to the boiling temperature. After cooling, the butylamine hydrochloride that had formed was removed by washing with water, the toluene phase was dried with sodium sulfate, and then the solvent and excess butylamine were removed by distillation. The oily residue was taken up in ether. The hydrochloride of 3-n-butylamino-acetylamino-2-carbomethoxy-5-methylthiophene was obtained by introducing hydrogen chloride gas or by means of methanolic hydrochloric acid. Yield: 92 percent. For purification, the substance was recrystallized from water; it was found to melt at 154°– 156° C.

In analogous manner, there were obtained, using the corresponding amines:

3-diethylaminoacetylamino-2-carbomethoxy-4-methylthiophene hydrochloride, melting point 157°–158° C.;

3-piperidino-acetylamino-2-carbomethoxy-4-methylthiophene, melting point 110°– 111° C. (hydrochloride: melting point 188° C.);

3-pyrrolidino-acetylamino-2-carbomethoxy-4-methylthiophene hydrochloride, melting point 182°–183° C.;

3-isopropylamino-acetylamino-2-carbomethoxy-4-methylthiophene hydrochloride, melting point 98°– 99° C.

3-(N-methylpiperazino)-acetylamino-2-carbomethoxy-4-methylthiophene dihydrochloride, melting point 197°– 200° C.

The following compounds were prepared from 3-chloroacetylamino-4-carbomethoxy-2-methylthiophene, melting point 137°– 138° C.:

3-n-butylamino-acetylamino-4-carbomethyoxy-2-methylthiophene hydrochloride, which crystallizes with 1 mol of crystal water upon recrystallization from water, melting point 142°– 143° C.

3-diethylaminoacetylamino-4-carbomethoxy-2-methylthiophene hydrochloride, melting point 163° – 164° C.

The following compounds were prepared from 3-chloroacetylamino-5-carbomethoxy-2,4-dimethylthiophene, melting point 142° – 143° C.:

3-n-butylamino-acetylamino-5-carbomethoxy-2,4-dimethylthiophene hydrochloride, melting point 234° (with decomposition);

3-diethylaminoacetylamino-5-carbomethoxy-2,4-dimethylthiophene hydrochloride, melting point 112°–114° C.

The following compounds were prepared from 3-α-chloropropionylamino-2-carbomethoxy-4-methyl-thiophene, melting point 99° – 101° C.:

3-n-propylamino-α-propionylamino-2-carbomethyoxy-4-methylthiophene hydrochloride, melting point 177° – 178° C. (boiling point of the base: 162° – 167° C. under a pressure of 0.3 mm Hg);

3-n-butylamino-α-propionylamino-2-carbomethoxy-4-methylthiophene hydrochloride, melting point 178° – 180° C.;

3-diethylamino-α-propionylamino-2-carbomethoxy-4-methylthiophene hydrochloride, melting point 1780° – 180° C.;

3-pyrrolidino-α-propionylamino-2-carbomethoxy-4-methylthiophene hydrochloride, melting point 190° – 195° C.;

3-allylamino-α-propionylamino-2-carbomethoxy-4-methylthiophene hydrochloride, melting point 170° – 171° C., and 3-butylamino-α-propionylamino-2-carbomethoxy-4-methylthiophene phosphate, melting point 193° – 194° C.

The following compounds were prepared from 3-β-chloropropionylamino-2-carbomethoxy-4-methylthiophene, melting point 108° – 110° C.;

3-n-butylamino-β-propionylamino-2-carbomethoxy-4-methylthiophene hydrochloride, melting point 174°–175° C.;

3-n-propylamino-β-propionylamino-2-carbomethoxy-4-methylthiophene hydrochloride, melting point 200° – 202° C.;

3-diethylamino-β-propionylamino-2-carbomethoxy-4-methylthiophene hydrochloride, melting point 101° – 102° C.;

3-pyrrolidino-β-propionylamino-2-carbomethoxy-4-methylthiophene hydrochloride, melting point 138° – 139° C.;

3-morpholino-β-propionylamino-2-carbomethoxy-4-methyl-thiophene hydrochloride, melting point 152° – 153° C.

The following compounds were prepared from 3-chloroacetylamino-2-carbethoxy-4-methlythiophene, melting point 103° – 104° C.;

3-n-butylaminoacetylamino-2-carbethoxy-4-methylthiophene hydrochloride, melting point 130° – 134° C.;

3-diethylamino-acetylamino-2-carbethoxy-4-methylthiophene, boiling point(0.05 mm Hg) 160°.–162° C., (hydrochloride: melting point 130° – 132° C.).

EXAMPLE 2

17.6 g of 3-chloroacetylaminothiophene, obtained by decarboxylation of 3-amino-2-carboxy-thiophene and subsequent reaction of the resulting 3-aminothiophene (boiling point 50° C. under a pressure of 0.06 mm Hg) with chloroacetyl chloride, were heated for 7 hours to the boiling temperature with 300 ml of benzene and 23 ml of n-butylamine. After cooling, the butylamine hydrochloride that had formed was removed by washing with water, the benzene phases were dried with sodium sulfate, and then the solvent and excess butylamine were removed by distillation. The oily residue, which partly crystallized, was taken up in ether and the hydrochloride of 3-n-butylaminoacetylaminothiophene was precipitated by introduction of hydrogen chloride gas or by means of methanolic hydrochloric acid. Yield: 19g. The hydrochloride was found to melt, after recrystallization from i-propanol, at 219° – 220° C.

In an analogous manner, using the corresponding amines, the following compounds were obtained from 3-chloroacetylamino-4-methylthiophene (melting point 95° – 96° C.), prepared by decarboxylation of 3-amino-2-carboxy-4-methyl-thiophene (melting point 123° C.) and subsequent reaction of the resulting 3-amino-4-methylthiophene (melting point 45° C./0,05 mm Hg) with chloroacetyl chloride:

3-n-butylaminoacetylamino-4-methylthiophene, melting point 145° – 150° C./0.05 mm Hg (melting point of the hydrochloride: 219° – 220° C.);

3-n-propylaminoacetylamino-4-methylthiophene, melting point 144° C./0.15 mm Hg (melting point of the hydrochloride: 218° – 219° C.);

3-diethylamino-acetylamino-4-methylthiophene, melting point 52° – 55° C. (melting point of the hydrochloride: 118° – 120° C.);

3-cyclohexylaminoacetylamino-4-methylthiophene-hydrochloride, melting point 250° C. (decomposition).

The following compounds were prepared from 3-chloroacetylamino-2,4-dimethyl-thiophene (melting point 120° – 122° C.), obtained upon reaction with chloroacetyl chloride of the 3-amino-2,4-dimethylthiophene, formed by the saponification and decarboxylation of 3-amino-5-carbomethoxy-2,4-dimethylthiophene (melting point 82° – 84° C.);

3-n-butylamino-acetylamino-2,4-dimethylthiophene hydrochloride, melting point 230° – 232° C.;

3-diethylaminoacetylamino-2,4-dimethylthiophene hydrochloride, melting point 174° – 176° C.

The following compounds were prepared from 3-α-chloropropionylamino-4-methylthiophene (melting point 74° – 75° C.), which can be prepared from 3-amino-4-methyl-thiophene (melting point 45° C./0.05 mm Hg) and α-chloropropionylchloride;

3-n-propylamino-α-propionylamino-4-methylthiophene, melting point 140° – 144° C./0.1 mm Hg (melting point hydrochloride: 218° – 219° C.);

3-n-butylamino-α-propionylamino-4-methylthiophene, melting point 66° C. (melting point of the hydrochloride: 130° – 134° C.).

The following compounds were prepared from 3-β-chloropropionylamino-4-methylthiophene (melting point 108° – 109° C.), obtained from 3-amino-4-methylthiophene and β-chloropropionyl chloride: 3-n-butylamino-β-propionylamino-4-methylthiophene hydrochloride, melting point 170° – 171° C.;

3-n-propylamino-β-propionylamino-4-methylthiophene hydrochoride, melting point 159.5° – 160.5° C.;

3-pyrrolidino-β-propionylamino-4-methylthiophene hydrochloride, melting point 169° – 170° C.

EXAMPLE 3

3-Diethylaminoacetylamino-2-carbomethoxy-4-methylthiophene 9 g of 3-amino-2-carbomethoxy-4-methylthiophene (melting point 84° – 85° C.) were introduced portionwise, while stirring and while cooling with ice water, into a suspension of 15 g of diethylaminoacetic acid chloride-hydrochloride in 100 ml of acetone and the whole was then heated for 30 minutes to the boiling temperature. After cooling, the 3-diethylaminoacetylamino-2-carbomethoxy-4-methylthiophene hydrochloride was filtered off with suction. For purification, the hydrochloride was dissolved in water, shaken out with ether, and the base was precipitated with potassium carbonate solution. The base was taken up in ether and dried with sodium sulfate. After removal of the ether, the residue was distilled in a high vacuum. In this manner, 6 g of 3-diethylaminoacetylamino-2-carbomethoxy-4-methylthiophene, boiling point 161° – 165° C. under a pressure of 0.1 mm Hg, were obtained. the hydrochloride was found to melt, after recrystallization from a mixture of isopropanol and diisopropyl ether, at 157° – 158° C.

EXAMPLE 4

3-Diethylaminoacetylamino-2-carbomethoxy-4-methylthiophene 14.3 g of 3-diethylaminoacetylamino-2-carbomethoxy-4-methyl-4,5-dihydrothiophene (melting point 156° – 161° C. under a pressure of 0.05 mm Hg) were dissolved in 50 ml of methylene chloride and, at −5° to −10° C., a solution of 8 g of bromine in 25 ml of methylene chloride was added dropwise, while stirring. Stirring was continued for 1 hour at the same temperature. The excess bromine and the hydrogen bromide that had formed were removed by passing air through the solution and the methylene chloride was then removed in a water jet vacuum. The residue was dissolved in water and the aqueous solution was shaken with ether. After separation of the ether, the base was precipitated from the hdyrobromic solution by means of sodium carbonate solution, taken up in ether, and the ether solution was dried with sodium sulfate. After removal of the ether by distillation, the residue was distilled in a high vacuum at 161° – 165° C. and under a pressure of 0.1 mm Hg. 7.7 g of 3-diethylaminoacetylamino-2-carbomethoxy-4-methylthiophene (melting point of the hydrochloride 157° – 158° C.) were obtained.

The starting substance was obtained by reacting 3-chloroacetylamino-2-carbomethoxy-4-methyl-4,5-dihydrothiophene (melting point 84° – 85° C.) [prepared by the reaction of 2-carbomethoxy-4-methyl-thiophanone-(3), melting point 75° C./0.05 mm Hg), and chloroacetyl chloride] with diethylamine.

EXAMPLE 5

3-Diethylaminoacetylamino-2-carbomethoxy-4-methylthiophene 36 g of 3-isocyano-2-carbomethoxy-4-methylthiophene (melting point 107° – 108° C.), obtained from 3-formylamimo-2-carbomethoxy-4-methylthiophene (melting point 130° – 131° C.) according to known methods (cf. Neue Methoden der praparativen organischen Chemie, Volume IV, page 43), 25.8 ml of diethylamine, 25 ml of 30 percent formaldehyde solution, 100 ml of acetone and 50 ml of water were combined, and to the whole were added, while cooling, 25 ml of concentrated hydrochloric acid. The mixture was allowed to stand for 60 hours at room temperature and then distributed between water and ether. The aqueous phase was rendered alkaline by means of sodium carbonate solution and shaken several times with ether. After drying with sodium sulfate, the ether was removed and the residue was distilled under reduced pressure. 42 g of diethylamino-acetylamino-4-methlythiophene, boiling at 161° – 165° C. under a pressure of 0.1 mm Hg, were obtained. The hydrochloride was found to melt at 157° – 158° C.

EXAMPLE 6

3-Diethylamino-β-butyrylamino-4-methylthiophene 10.5 g of 3-crotonylamino-4-methylthiophene (melting point 99° – 100° C.), which has been obtained from 3-amino-4-methylthiophene and crotonic acid chloride, were dissolved in 34 ml of diethylamine and heated for 20 hours to 140° – 150° C. in an autoclave. After cooling, the excess diethylamine was removed by distillation, the residue was dissolved in ether and shaken with 2N hydrochloric acid. After separation of the ether layer, the base was precipitated from the aqueous layer with sodium carbonate solution and taken up in ether. The ether solution was dried with sodium sulfate. Upon addition of ethereal hydrochloric acid, the hydrochloride of 3-diethylamino-β-butyrylamino-4-methylthiophene precipitated; after recrystallization from a mixture of ethanol and ether, the compound was found to melt at 164° – 165° C. Yield: 5g.

EXAMPLE 7

3-n-Butylamino-acetylamino-4-methylthiophene 9.5 g of N-benzyloxycarbonyl-n-butylaminoacetic acid and 5 ml of triethylamine were dissolved in 50 ml of tetrahydrofuran and to this solution there were added dropwise, at −5° C., while stirring, 3.4 ml of chloroformic acid ethyl ester. The whole was stirred for 15 minutes at this temperature. Then, a solution of 4 g of 3-amino-4-methylthiophene in 20 ml of tetrahydrofuran, which solution had likewise been cooled to −5° C., was added and the whole was stirred for 2 hours. During this time, the temperature of the mixture was allowed to rise slowly to room temperature. Then water was added in order to dissolve out the triethylamino hydrochloride, the aqueous phase was shaken again with ether, and the combined organic solutions were dried with sodium sulfate. The residue remaining after removal of the solvent by distillation was allowed to stand for 1 hour with 40 ml of a solution of hydrogen bromide in glacial acetic acid (about 37percent). Thereby, the hydrobromide of 3-n-butylaminoacetylamino-4-methylthiophene precipitated; it was filtered off with suction and washed with ether. Yield: 7 g. Melting point: 200° − 202° C. It was introduced, while stirring, into a sodium carbonate solution and the base set free was taken up in ether. After drying of the ether solution, the hydrochloride of 3-n-butylamino-4-methylthiophene (219° − 220° C.) was precipitated by means of ethereal hydrochloric acid.

In analogous manner, 3-n-butylaminoacetylamino-5-carbomethoxy-2,4-dimethylthiophene hydrochloride, melting point 234° C. (with decomposition), was obtained from N-benzyloxycarbonyl-n-butylaminoacetic acid and 3-amino-5-carbomethoxy-2,4-dimethylthiophene.

EXAMPLE 8

3-n-Butylaminoacetylamino-4-methylthiophene 27 g of 3-n-butylaminoacetylamino-2-carboxy-4-methylthiophene, which had been obtained by hydrolysis of 3-n-butylaminoacetylamino-2-carbomethoxy-4-methylthiophene with 4N-aqueous sodium hydroxide solution at room temperature, were slowly heated with 27 g of copper powder and 300 ml of quinoline to 190° − 200° C. From 130° − 140° C. onwards, evolution of gas could be observed. The whole was kept at this temperature until the evolution of $CO_2$ slowed (about 2 − 3 hours). After cooling, the copper powder was separated by filtration and the quinoline was removed by distillation in a water jet vacuum. There remained 15 g of an oil, which was found to boil at 145° − 150° C. under a pressure of 0.05 mm Hg. The 3-n-butylaminoactylamino-4-methylthiophene could be converted into the hydrochloride by rubbing with 2N aqeuous hydrochloric acid; after recrystallization from ethanol, the hydrochloride was found to melt at 219° − 220° C.

What is claimed is:

1. a substituted 3-aminoacylamino-thiophene of the formula

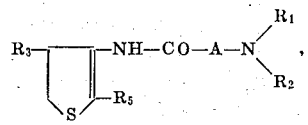

and physiologically tolerated salts thereof, wherein $R_1$, taken alone, is hydrogen or alkyl having up to four carbon atoms; $R_2$, taken alone, is alkyl having up to four carbon atoms; $R_1$ and $R_2$, taken together with the nitrogen atom to which they are attached, are piperidino, pyrrolidino, morpholino, or N-methyl piperazino; one of $R_3$ and $R_5$ is methyl and the other is carbomethoxy or carbethoxy; and A is alkylene having one or two carbon atoms.

2. 3-n-Propylamino-α-propionylamino-2-carbomethoxy-4-methyl-thiophene and the physiologically tolerated salts thereof.

3. 3-Diethylamino-β-propionylamino-2-carbomethoxy-4-methyl-thiophene and the physiologically tolerated salts thereof.

4. 3-n-butylamino-β-propionylamino-2-carbomethoxy-4-methyl-thiophene and the physiologically tolerated salts thereof.

5. 3-n-butylamino-α-propionylamino-2-carbomethoxy-4-methyl-thiophene and the physiologically tolerated salts thereof.

6. 3-n-propylamino-β-propionylamino-2-carbomethoxy-4-methylthiophene and the physiologically tolerated salts thereof.

* * * * *

UNITED STATES PATENT OFFICE
CERTIFICATE OF CORRECTION

Patent No. 3,855,243    Dated December 17, 1974

Inventor(s) Heinrich Ruschig et al.

It is certified that error appears in the above-identified patent and that said Letters Patent are hereby corrected as shown below:

In the Heading: Item "[63]," line 2, change "which is a continuation-in-part" to -- which is a continuation --.

Signed and sealed this 1st day of April 1975.

(SEAL)
Attest:

RUTH C. MASON
Attesting Officer

C. MARSHALL DANN
Commissioner of Patents
and Trademarks